United States Patent Office 3,007,906
Patented Nov. 7, 1961

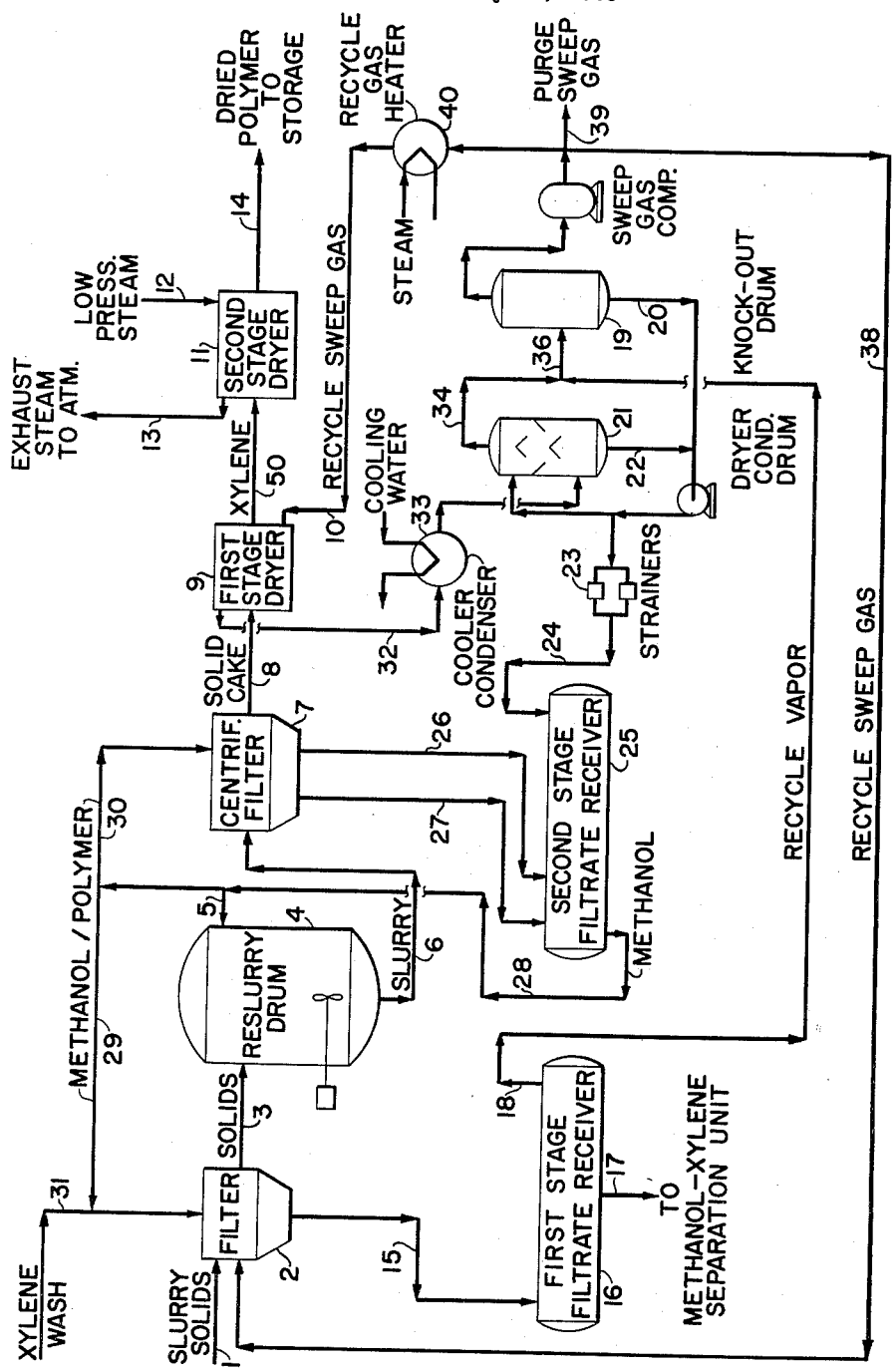

3,007,906
INTEGRATED POLYMER DRYING
Norman F. Linn, Summit, and Frank J. Herrmann, Morristown, N.J., assignors to Esso Research and Engineering Company, a corporation of Delaware
Filed July 27, 1959, Ser. No. 829,620
4 Claims. (Cl. 260—93.7)

This invention relates to an improved method of recovering and drying polymer products obtained by the low pressure polymerization of alpha olefins. More particularly it relates to a process of this nature in which an integrated operation is provided for both recovering and drying these polymers.

The low pressure polymerization of alpha or 1 olefins with catalyst systems made up of a partially reduced, heavy, transition metal compound and a reducing metal-containing compound to high density, often isotactic, high molecular weight, solid, relatively linear products has been assuming ever increasing importance and is now well known.

For the purpose of convenience details of the low pressure catalytic process and the products obtained thereby are presented below, although it should be realized that these by themselves constitute no part of this invention.

The alpha olefinic feeds utilized in polymerization and copolymerization include $C_2$–$C_6$ olefins and higher, e.g. ethylene, propylene, butene-1, hexene-1, etc., with ethylene and propylene preferred. The process is described in the literature, e.g. see U.S. Patent 810,023, and "Scientific American," September 1957, pages 98 at seq.

In that process the polymers are prepared by polymerizing the monomer with the aid of certain polymerization catalysts. The catalysts are solid, insoluble reaction products obtained by partially reducing a heavy metal compound of a group IV–B, V–B, and VI–B metal of the periodic system, such as vanadium tetrachloride, or a titanium halide, e.g. $TiCl_4$, $TiBr_4$, etc., preferably with metallic aluminum. The preferred catalyst of this type is usually prepared by reducing 1 mole of titanium tetrahalide, usually tetrachloride, with about one-third mole of aluminum to give a material corresponding to $TiCl_3 \cdot 0.33AlCl_3$, thus containing cocrystallized $AlCl_3$. (For further details see copending U.S. application Serial No. 578,198, filed April 6, 1956, and Serial No. 766,376, filed October 19, 1958.) The product is then activated with an aluminum alkyl compound corresponding to the formula RR'AlX. In this formula R, R' and X preferably are alkyl groups of 2 to 8 carbon atoms, although X may alternatively be hydrogen or a halogen, notably chlorine. Typical examples of the aluminum alkyl compounds are aluminum triethyl, aluminum sesquichloride, aluminum triisobutyl, etc.

The monomers are then contacted with the resulting catalyst in the presence of an inert aromatic hydrocarbon solvent. Th aromatics that have been shown to be particularly useful for this purpose include benzene, toluene and xylene. The polymerization is conveniently effected at temperatures of about 0° to 100° C. and pressures ranging from about 0 to 500 p.s.i.g., usually 0 to 100 p.s.i.g. The catalyst concentration in the polymerization zone is preferably in the range of about 0.1 to 0.5 wt. percent based on total liquid and the polymer product concentration in the polymerization zone is preferably kept between about 2 to 15% based on total contents so as to allow easy handling of the polymerized mixture. The proper polymer concentration can be obtained by having enough of the inert diluent present or by stopping the polymerization short of 100% conversion.

When the desired degree of polymerization has been reached, a $C_1$ to $C_3$ alkanol such as methyl alcohol, ethanol or isopropyl alcohol is normally added to the reaction mixture for the purpose of partially dissolving and deactivating the catalyst and for precipitating some of the dissolved portion of the polymer product from solution. The resultant alkanol-aromatic mixture is separated from the precipitated polymer by conventional means such as filtration or centrifuging.

The polymers produced have number average molecular weights in the range of about 100,000 to 300,000 or even as high as 3,000,000 as determined by the intrinsic viscosity method using the I. Harris correlation (J. Polymer Science 8, 361, 1952). The polymers can have a high degree of crystallinity and a low solubility in n-heptane.

It is to be understood that the term "low pressure" polymer as used herein connotes material prepared in the indicated manner and includes homo- and copolymers.

The polymer product obtained has in many cases been characterized by an undesirable odor. With inhibited non-oxidized polymers this odor arises from small amounts of retained aromatics, e.g. xylene.

This invention provides an improved integrated method of overcoming these difficulties. The method comprises filtering a slurry of the polymer contained in the $C_1$–$C_3$ alkanol-aromatic hydrocarbon diluent mixture in the presence of added sweep gas; withdrawing the filter cake and sweep gas from the previous step; reslurrying the filter cake with a similar alkanol; centrifuging the resultant slurry to separate polymer from liquid; treating the thus separated polymer countercurrently in a drying zone with heated recycle sweep gas; treating the thus dried polymer countercurrently in a second drying zone with steam at a maximum velocity of about 0.5 ft./sec. to reduce the aromatic content to a maximum of 0.2 wt. percent and recovering the dried polymer product. The sweep gas withdrawn from the filtration step can be recycled back thereto. Additional details follow.

A typical sweep gas composition is as follows:

| Comp.: | Vol. percent |
|---|---|
| $C_2$ | 1.0 |
| $C_3$= | 42.0 |
| $C_3$ | 25.0 |
| Arom. solv | 1.0 |
| Methanol | 31.0 |
| Total | 100.0 |

"Sweep gas" is defined as the gas in equilibrium with the solvents, precipitants and other reaction components and will thus vary with temperature, pressure and any given system.

The sweep gas prior to contacting the polymer in the first drying stage is heated to a temperature in the range of about 200° to 300° F.

The steam utilized in the second drying treatment is at a temperature in the range of about 212° to 300° F.

This invention will be better understood by reference to the flow diagram and the following examples.

In the drawing is represented an operation with a methanol-xylene slurry of polypropylene prepared with a $TiCl_3 \cdot 0.33AlCl_3$, aluminum triethyl activated catalyst. The polymer concentration is about 5 wt. percent. The slurry is sent through pan filter 2 from line 1. The filter cake in a 25–35 wt. percent concentration in the mother liquor is taken off through line 3 to reslurry drum 4. In drum 4 about 5 to 10 lbs. of methanol per pound polymer are added through line 5 for additional washing. The slurry of solid polymer together with the methanol and xylene, etc. is withdrawn through line 6 at a maximum concentration of 10 wt. percent of polymer solids to centrifuge 7. In 7 the polymer is further separated from liquid and a 50 wt. percent solid cake withdrawn through line 8 to first stage drying zone 9. The polymer in 9 is contacted countercurrently with sweep gas at a temperature of 230° F. which enters through line 10 and in a quantity sufficient to give a velocity of 0.2 to 1.5 ft. per second in the drying zone 9. The thus treated polymer containing a maximum of about 1 wt. percent aromatics is withdrawn through line 50 to an additional drying zone 11. The polymer at entering the zone contains a maximum of 1 wt. percent xylene. The system is contacted with low pressure steam from line 12 at a velocity of .2 foot per second and at a temperature of 230° F. The vapor velocity figures are the same as in the preceding drying zone. The exhaust steam is vented to the atmosphere through line 13. The polypropylene product which contains a maximum of .2 wt. percent xylene is withdrawn through line 14 and can be sent to storage or to further processing.

The details of the liquid recovery system and the sweep gas circulation will now be described. The filtrate plus some sweep gas is withdrawn through pan filter 2 through line 15 to receiver 16. The liquid is withdrawn therefrom through line 17 and sweep gas taken overhead through line 18 to knock-out drum 19. The liquid is withdrawn through line 20 to dryer condensate drum 21. The liquid separated from sweep gas is then withdrawn through line 22 and sent to strainers 23 where any remaining solid polymer is finally removed. The liquid is then sent through line 24 to second stage filtrate receiver 25. Liquid withdrawn from centrifuge 7 and lines 26 and 27 also enters receiver 25. The liquid withdrawn from 25 comprising 80 to 90 wt. percent methanol is sent through line 28 to reslurry drum 4 through line 28 and to the pan filter 2 and centrifuge 7 through lines 29 and 30. If necessary additional xylene for washing can be added through line 31 to pan filter 2.

The sweep gas leaving dryer 9 is sent through line 32 through cooler 33 wherein its temperature is reduced to 110° F. and then sent into dryer condensate drum 21. The sweep gas withdrawn overhead through line 34 together with sweep gas from filtrate receiver 16 and line 18 is sent through line 36 into knock-out drum 19. Sweep gas taken overhead from knock-out drum 19 through line 37 is compressed, then split, and a portion recycled through line 38 to pan filter 2. Some is purged through line 39 and the remainder reheated in heat exchanger 40 and at a temperature of 230° F. is recycled through line 10 to first stage dryer 9.

It will be apparent that various modifications can be made such as using several stages of each drying zone.

The advantages of this invention will be apparent to those skilled in the art. An efficient integrated operation is thus provided for polymer drying.

It is to be understood that this invention is not limited to the specific examples which have been offered merely as illustrations and that modifications may be made without departing from the spirit of the invention.

What is claimed is:

1. An integrated process for recovering and drying a solid, relatively linear, alpha olefin polymer contained in a slurry thereof in a $C_1$–$C_3$ alkanol-aromatic hydrocarbon diluent mixture which comprises the steps of (1) filtering the slurry in the presence of added sweep gas; (2) withdrawing a filter cake and the sweep gas from step 1; (3) reslurrying the filter cake with a $C_1$–$C_3$ alkanol in a washing zone; (4) centrifuging the resultant slurry to separate polymer from liquid; (5) treating the separated polymer countercurrently in a drying zone with heated recycle sweep gas, at a temperature in the range of about 200° to 300° F., to reduce the aromatic content of the polymer to a maximum of about 1 wt. percent; (6) treating the thus dried polymer countercurrently in an additional drying zone with steam at about 212° to 300° F. and at a maximum velocity of about 0.5 ft./sec. to reduce the aromatic content to a maximum of 0.2 wt. percent and recovering dried polymer product.

2. The process of claim 1 including the additional step of recycling sweep gas from step 2 to step 1.

3. The process of claim 1 including the additional step of recycling heated sweep gas to step 5.

4. The process of claim 1 in which the polymer is polypropylene, the alkanol is methanol and the aromatic is xylene.

References Cited in the file of this patent

UNITED STATES PATENTS

| | | |
|---|---|---|
| 1,693,417 | Wait | Nov. 27, 1928 |
| 2,475,628 | McSweeney | July 12, 1949 |
| 2,838,477 | Roelen | June 10, 1958 |
| 2,845,414 | Schutze | July 29, 1958 |
| 2,886,561 | Reynolds | May 12, 1959 |
| 2,899,413 | Hagemeyer et al. | Aug. 11, 1959 |
| 2,929,808 | Ross et al. | Mar. 22, 1960 |